(12) United States Patent
Grieser

(10) Patent No.: US 6,471,160 B2
(45) Date of Patent: Oct. 29, 2002

(54) METHOD FOR DEPLOYING A PARACHUTE ON A DRONE

(75) Inventor: Wolfram Grieser, Riemerling (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/865,106

(22) Filed: May 24, 2001

(65) Prior Publication Data

US 2001/0048050 A1 Dec. 6, 2001

(30) Foreign Application Priority Data

May 27, 2000 (DE) ........................................ 100 26 469

(51) Int. Cl.[7] .............................................. B64C 25/56
(52) U.S. Cl. .................... 244/139; 244/147; 244/138 R
(58) Field of Search ............................. 244/138 R, 139, 244/140, 141, 152, 147–150

(56) References Cited

U.S. PATENT DOCUMENTS

| | | | | |
|---|---|---|---|---|
| 2,719,685 A | * | 10/1955 | Bender et al. .............. | 244/139 |
| 3,749,333 A | * | 7/1973 | Lykken et al. ............. | 244/3.15 |
| 3,863,869 A | * | 2/1975 | Bachman .................... | 244/139 |
| 5,620,153 A | * | 4/1997 | Ginsberg .................... | 244/139 |
| 5,826,827 A | * | 10/1998 | Coyaso et al. .............. | 244/139 |

* cited by examiner

Primary Examiner—Galen L. Barefoot
(74) Attorney, Agent, or Firm—W. F. Fasse; W. G. Fasse

(57) ABSTRACT

A flying drone includes a flight control computer, a parachute system with a parachute, a power supply system, a propulsion system, and an actuating drive system, without any of these systems being redundantly duplicated. To prevent uncontrolled crashing of the drone due to a critical error of any subsystem, signals or data are supplied from the power supply system, the propulsion system, and the actuating drive system, to an error detection or recognition device, which detects defined errors or error combinations in the provided signals or data and then supplies a deployment signal to the parachute system, which responsively generates a control signal that triggers an ejection mechanism to eject the parachute.

9 Claims, 1 Drawing Sheet

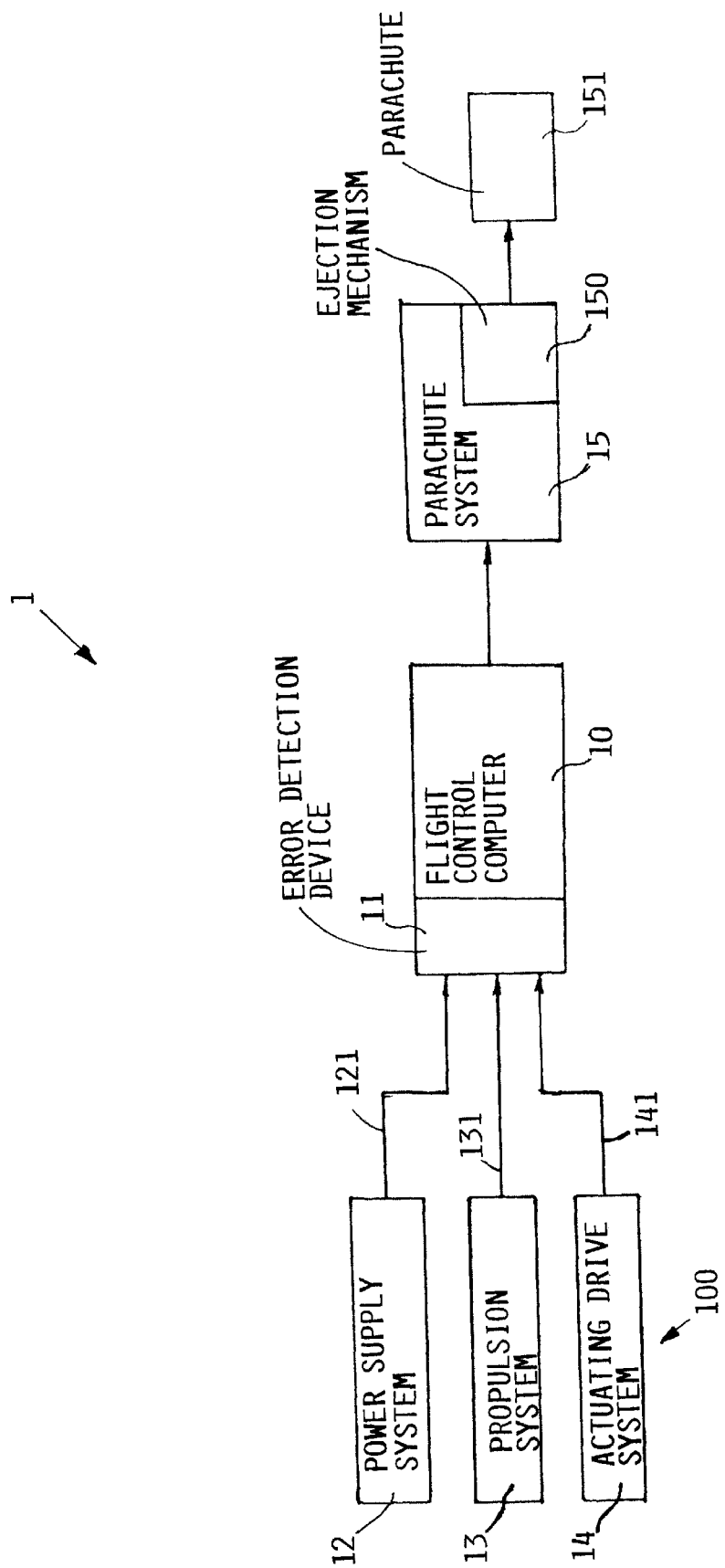

METHOD FOR DEPLOYING A PARACHUTE ON A DRONE

PRIORITY CLAIM

This application is based on and claims the priority under 35 U.S.C. §119 of German Patent Application 100 26 469.7, filed on May 27, 2000, the entire disclosure of which is incorporated herein by reference.

FIELD OF THE INVENTION

The invention relates to a method of deploying a parachute on a drone air vehicle so as to avoid an uncontrolled crash of the drone.

BACKGROUND INFORMATION

A drone is an unmanned airborne vehicle for civil or military applications, for example for area reconnaissance. The drone is generally programmed or controlled to land according to plan in a desired location, once its mission is fulfilled. To this effect a control device of the drone activates a parachute system according to a program, so that the parachute system ejects and activates a parachute connected to the drone. The drone lands in the target area by means of the parachute. It is known that the drone can trigger the parachute system by means of a flight control computer and its program, integrated in the control device. There is also the option of triggering the parachute system over the target area by way of remote-controlled signaling to the flight control computer. In all these cases, the landing procedure is planned, i.e. intended.

Apart from the flight control computer, the control system of a drone at least also comprises such subsystems as the hydraulic system, the electrical system, the power supply system, the propulsion system and the control and actuating drive system. These are error-critical subsystems, whereby an individual failure of a subassembly from one of these systems frequently leads to the loss of the drone. In the case of failure, such a drone cannot make an emergency landing. It crashes or self-destructs. Such a case of failure can endanger the immediate surroundings in the area of the crash or destruction of the drone. Furthermore, the operator of the drone will desire far-reaching protection of the drone so as to be able to reuse it after repairing affected subassemblies.

Operators of drones have conventionally attempted to solve the above problems by employing the same design approach as is used for achieving adequate safety in manned airborne vehicles, namely by means of redundant design and provision of the various subsystems of the control system, e.g. providing two propulsion engines, two actuators for each actuating function, etc. This means duplicating all subsystems necessary to maintain proper command and operation of the drone in case of failure of a first one of the respective subsystems, including propulsion, power supply, control, etc. By such duplication, a back-up redundancy of the subsystems is attained. In the case of failure of a subsystem, planned continued operation of the drone is thus ensured by the continued proper operation of the respective second redundant subsystem. However, this solution leads to a drastic increase of the flying weight of the drone, so that a more powerful propulsion system is required. The conventional approach is thus very intensive in materials and costs, both in the original manufacturing and in the ongoing operation of the drone.

SUMMARY OF THE INVENTION

In view of the above, it is an object of the invention to make a drone more economical by simplifying its subsystems while in the case of failure nevertheless preventing the drone from crashing in an uncontrolled way, to the extent that this is possible. The invention further aims to avoid or overcome the disadvantages of the prior art, and to achieve additional advantages, as apparent from the present specification.

The above objects have been achieved according to the invention in a drone air vehicle and a method of deploying a parachute from the drone. According to the invention, signals and/or data are supplied from at least flight-relevant subsystems such as the power supply system, the propulsion system and the actuating drive system to an error detection device via signal connections and/or data connections. The error detection device detects errors or error combinations according to a program and then, in response to detecting such an error or error combination, supplies a signal to the parachute system so that the parachute system forms a control signal which causes ejection of the parachute by the ejection mechanism. Thus, if a critical error condition (which would likely lead to lack of control and/or crashing of the drone) is detected, the drone will automatically and self-sufficiently be deactivated and will be carried safely down to the ground or water on the deployed parachute. With the inventive arrangement and method, it is not necessary to provide redundancy of the various systems, i.e. single systems can be provided without backup, because the drone can be safely recovered even if one or more of its singly provided subsystems suffers an error or failure.

The invention provides the advantage, despite the use of single systems, i.e. without redundantly duplicating flight-relevant systems, of nevertheless providing a reduced risk of losing the drone. Thus not only can development and production costs be reduced, but also the costs of operating the drone can be reduced as it can carry an increased payload and/or has a reduced fuel requirement.

BRIEF DESCRIPTION OF THE DRAWINGS

In order that the invention may be clearly understood, it will now be described in connection with an example embodiment, with reference to the single accompanying drawing FIGURE, which is a schematic block diagram of a control arrangement for a drone according to the invention, without redundant duplication of subsystems thereof.

DETAILED DESCRIPTION OF PREFERRED EXAMPLE EMBODIMENTS AND OF THE BEST MODE OF THE INVENTION

The control arrangement 1 according to the single FIGURE includes a flight control computer 10 of a drone air vehicle. The flight control computer 10 is connected to subordinate subsystems 100 of the drone, which are controlled or regulated by the flight control computer 10. The flight control computer 10 receives information from failure-relevant subsystems 100, such as for example a power supply system 12 via the signal and data connection 121, a propulsion system 13 via the signal and data connection 131, and an actuating drive system 14 via the signal and data connection 141.

The power supply system 12, the propulsion system 13, and the actuating drive system 14 may each individually be embodied according to any known conventional teachings for such systems in air vehicles and particularly in drones. For example, the propulsion system 13 may comprise any known jet engine, turbine engine, or a combustion engine coupled to a drive propeller, or the like. The actuating drive system 14 may comprise any known electrical, pneumatic, hydraulic, or hybrid actuators and actuator linkages or transmission arrangements for controlling the relevant control surfaces of the drone. The power supply system 12 may comprise any known system for supplying electrical, pneumatic and/or hydraulic power. The signal and data connections 121, 131, 141 may be hardwired (e.g. electrical conductors or optical fibers) or in a wireless configuration (e.g. infrared or radio signal receivers and transmitters).

The signal and data connections 121, 131, 141 transmit actual signal parameters or operating state data of the subsystems 100 to an error detection or recognition device 11 which is preferably integrated in the flight control computer 10. The signals or data provided from the subsystems 100 may comprise any information that is relevant and/or indicative of the proper operation of the associated subsystem, e.g. the power available from the power supply system, the operating temperature or r.p.m. of the propulsion system, the actuator position of respective actuators of the actuator drive system. The error detection device 11 functions according to any known error detection processes. For example, the incoming data or signals from the subsystems 100 may be compared to pre-defined error conditions stored in a lookup table, or may be compared to pre-defined normal operating parameter values or ranges, or may be analyzed by processing through appropriate functions and comparison with threshold values or the like. The error detection device 11 can be implemented either in software for the flight control computer 10 or in hardware.

The error detection or recognition device 11 comprises or contains recognition information for at least one error or error combination which has been defined according to the responsible computing program, whereby such error or error combination will lead to activation of the parachute system 15 if such an error has been detected by the program. In other words, the error detection device 11 has been pre-programmed to recognize certain error conditions or combinations of error conditions which are critical and would prevent the proper further operation of the drone on its mission, based on the signals received from the subsystems 12, 13 and 14 via the signal lines 121, 131, and 141. Some conditions may also be recognized as sub-critical, but as becoming critical if some other related condition arises in combination.

In other words, the error detection device 11 detects whether one or several subassemblies of the subsystems 100 are error-critical, i.e. have suffered an erroneous operation, are not responding or operating properly, or have partially or totally failed. If a detected error of at least one respective subassembly of at least one respective subsystem 100, or a combination of detected errors of several subassemblies or subsystems would be expected to lead to failure of the drone, then the error detection device 11 supplies a respective deployment signal to the parachute system 15. The parachute system 15 inter alia comprises an ejection mechanism 150 with a parachute 151, which may be embodied in any known manner. The parachute system 15 generates a control signal for one or several actuators of the ejection mechanism 150 which ejects the parachute 151 from the drone so that the parachute can unfold and open its canopy.

If a critical error is for example detected in a single subsystem, then as soon as the ejection mechanism 150 is activated, the remaining subsystems will be deactivated or shut-down by a corresponding deactivation signal, and the drone will glide to the ground, suspended from the parachute 151, without endangering the surroundings of the drone. For a landing on the ground or touch down on water, an integrated airbag can be deployed with the parachute to cushion the landing shock of the drone or prevent the drone from sinking until it is subsequently recovered.

In some situations (e.g. when the drone is operating in enemy territory in which it would be impossible for the operator of the drone to recover the downed drone), it may be desired to self-destruct the drone rather than to deploy the parachute 151 in the event of a critical error being detected by the error detection device. For this possibility, the flight control computer 10 can provide a self-destruct signal based on pre-programmed criteria (e.g. phase of the mission, actual location of the drone, etc.) or based on a remotely provided self-destruct command, in the event of the error detection device 11 detecting a critical error or error combination as discussed above. The self-destruct signal will block or override the parachute deployment signal and will instead cause the drone to self-destruct in any known manner.

The ability to eject the parachute 151 by the control device 1 of the drone in case of failure of any subsystem, makes it possible in an advantageous way to do without duplication or redundancy of the control device 1 or of the relevant subsystems 100, while still allowing a safe recovery of the drone. Thus, the drone can be produced more economically, while at the same time the possibility of reuse after failure remains. This is a decisive advantage compared to drones previously used by operators.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of deploying a parachute from an unmanned drone air vehicle having a single power supply system without redundancy, a single propulsion system without redundancy, a single actuating drive system without redundancy, and a parachute deployment system with a parachute, comprising the following steps:
   a) providing respective signals or data respectively from said power supply system, said propulsion system and said actuating drive system, to an error detection device;
   b) evaluating said respective signals or data in said error detection device so as to detect if said respective signals or data correspond to at least one of defined error conditions or error condition combinations;
   c) responsive to detecting that said respective signals or data correspond to at least one of said defined error conditions or error condition combinations, providing a deployment signal from said error detection device to said parachute deployment system;
   d) causing said parachute deployment system to deploy said parachute in response to said deployment signal; and
   e) landing said unmanned drone air vehicle by descending with said parachute deployed, in response to said deployment signal.

2. The method according to claim 1, wherein said step d) comprises forming a control signal in said parachute deployment system responsive to said deployment signal, providing said control signal to an ejection mechanism of said parachute deployment system, and triggering said ejection mechanism to deploy said parachute responsive to said control signal.

3. The method according to claim 1, wherein said method does not include the possibility of further operating said drone air vehicle with a redundant system in the event of detecting that said respective signals or data from at least one of said systems correspond to at least one of said error conditions or error condition combinations.

4. The method according to claim 1, wherein said drone air vehicle further includes a flight control computer, said error detection device is incorporated in said flight control computer, and said steps b) and c) comprise executing an evaluation program to evaluate said respective signals or data with respect to said error conditions or error condition combinations, which are defined by said evaluation program.

5. The method according to claim 1, further comprising providing a system shut-down signal coincident with said providing of said deployment signal, and shutting-down at least one of said systems responsive to said system shut-down signal.

6. The method according to claim 1, further comprising a step of deploying an air bag responsive to said deployment signal.

7. The method according to claim 1, wherein said entire method is carried out in an automated, self-contained and self-sufficient manner without receiving any control commands from outside of said drone air vehicle.

8. The method according to claim 1, wherein said defined error conditions or error condition combinations are indicative of a critical error in at least one of said power supply system, said propulsion system, and said actuating drive system that would prevent a further controlled flight of said unmanned drone air vehicle.

9. An unmanned drone air vehicle comprising:

a flight control computer including an error detection device incorporated therein, a single power supply system without redundancy, a single propulsion system without redundancy, a single actuating drive system without redundancy, a parachute deployment system including a parachute, respective signal or data connections respectively connecting said power supply system, said propulsion system, and said actuating drive system respectively to said error detection device for providing respective signals or data respectively from said power supply system, said propulsion system and said actuating drive system to said error detection device, and a deployment signal line connecting said flight control computer to said parachute deployment system, wherein said error detection device includes means for evaluating said respective signals or data so as to detect if said respective signals or data correspond to at least one of defined error conditions or error condition combinations and for providing a deployment signal via said deployment signal line to said parachute deployment system so as to deploy said parachute responsive to detecting that said respective signals or data correspond to at least one of said defined error conditions or error condition combinations.

* * * * *